US011406232B2

(12) United States Patent
Munoz et al.

(10) Patent No.: US 11,406,232 B2
(45) Date of Patent: Aug. 9, 2022

(54) TEAR RESISTANT WIPER

(71) Applicant: Kimberly-Clark Worldwide, Inc., Neenah, WI (US)

(72) Inventors: Lauren Munoz, Atlanta, GA (US); David A. Palzewicz, Canton, GA (US); Kristina M. Bloy, Neenah, WI (US); Dylan L. Wudtke, Appleton, WI (US); Alejandro Romero Villarreal, Buford, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 16/308,618

(22) PCT Filed: Jun. 8, 2017

(86) PCT No.: PCT/US2017/036512

§ 371 (c)(1),
(2) Date: Dec. 10, 2018

(87) PCT Pub. No.: WO2017/214372

PCT Pub. Date: Dec. 14, 2017

(65) Prior Publication Data

US 2019/0150679 A1 May 23, 2019

Related U.S. Application Data

(60) Provisional application No. 62/348,288, filed on Jun. 10, 2016.

(51) Int. Cl.
*A47K 10/42* (2006.01)
*D21H 27/02* (2006.01)
(Continued)

(52) U.S. Cl.
CPC ............ *A47K 10/421* (2013.01); *A47K 10/16* (2013.01); *B31F 1/07* (2013.01); *D21H 27/02* (2013.01); *A47K 2010/428* (2013.01)

(58) Field of Classification Search
CPC .................. A47K 10/16; A47K 10/421; A47K 2010/428; A47K 2010/3266; B08B 1/006;
(Continued)

(56) References Cited

U.S. PATENT DOCUMENTS 3,047,444 A * 7/1962 Harwood ................ D04H 1/66 428/153
4,659,608 A 4/1987 Schulz
(Continued)

FOREIGN PATENT DOCUMENTS

CN 2436080 Y 6/2001
CN 201388963 Y 1/2010
(Continued)

*Primary Examiner* — Gene O Crawford
*Assistant Examiner* — Kelvin L Randall, Jr.

(57) ABSTRACT

An improved tear resistant wiper is provided having a repeating pattern of thin, closely spaced curvilinear embossed elements adjacent the leading edge of the wipe and which pattern extends inwardly less than a third of the length of the wipe. The linear emboss elements have a high aspect ratio and narrow width in order to obtain a high density of embossments such that discrete unembossed regions within the leading edge region are small and yet the overall unembossed area still occupies at least 70% of the surface area.

16 Claims, 6 Drawing Sheets

(51) Int. Cl.
*B31F 1/07* (2006.01)
*A47K 10/16* (2006.01)

(58) Field of Classification Search
CPC ....... B31F 1/07; D21F 11/006; D21H 27/005; D21H 27/02
See application file for complete search history.

(56) References Cited

U.S. PATENT DOCUMENTS 4,759,967 A 7/1988 Bauernfeind
4,772,499 A 9/1988 Greenway
4,888,229 A 12/1989 Paley et al.
5,030,500 A * 7/1991 Perdelwitz, Jr. ........ B29C 65/18 428/137
5,085,914 A * 2/1992 Perdelwitz, Jr. ........ A47L 13/16 428/137
5,383,778 A 1/1995 Schulz
5,496,603 A 3/1996 Riedel et al.
5,540,332 A 7/1996 Kopacz et al.
5,562,805 A * 10/1996 Kamps ................... A47K 10/16 162/117
5,642,835 A 7/1997 Young et al.
5,667,635 A 9/1997 Win et al.
5,740,913 A 4/1998 McFarland
D418,305 S 1/2000 Zander et al.
6,015,605 A * 1/2000 Tsujiyama .......... A61F 13/4753 428/195.1
6,182,418 B1 * 2/2001 McFarland ........ B65D 83/0894 493/411
6,383,958 B1 * 5/2002 Swanson ............. A61F 13/0269 442/151
6,432,527 B1 8/2002 Perez et al.
6,455,129 B1 * 9/2002 Kershaw ................... B31F 1/07 156/205
6,548,136 B1 * 4/2003 Piccini ................... A47K 10/16 428/136
D490,985 S 6/2004 Ninmer
6,848,595 B2 2/2005 Lange et al.
D510,665 S 10/2005 Watts et al.
7,078,087 B2 7/2006 Romano, III et al.
7,276,642 B2 * 10/2007 Belau ................. A44B 18/0011 428/100
D738,114 S 9/2015 Koch et al.
2002/0081930 A1 * 6/2002 Jackson .................. C08L 33/08 442/416
2002/0179626 A1 12/2002 Huang et al.
2003/0026950 A1 2/2003 Kershaw et al.
2003/0121530 A1 * 7/2003 Borgonjon .............. A47L 13/17 134/6
2004/0040109 A1 3/2004 Lee
2004/0094004 A1 * 5/2004 Julius ................... A61K 8/0208 83/39
2004/0115393 A1 * 6/2004 Vogel ................... A47K 10/421 428/121
2005/0173085 A1 8/2005 Schulz
2005/0191460 A1 * 9/2005 Belau ...................... A61F 13/62 428/103
2006/0108082 A1 * 5/2006 Bogdanski ............. D21H 13/34 162/143
2006/0118993 A1 * 6/2006 Awofeso ................... B31F 1/07 264/156
2011/0117307 A1 5/2011 Fraser et al.
2011/0189442 A1 * 8/2011 Manifold ............... D21H 27/30 428/174
2011/0240514 A1 10/2011 Bandoh et al.
2014/0370224 A1 * 12/2014 Kien ......................... B26F 1/14 428/43
2015/0004367 A1 1/2015 Xu et al.
2015/0086760 A1 * 3/2015 Castillo ................ D04H 1/4291 428/198
2015/0322605 A1 * 11/2015 Chester ................... A61L 15/24 604/366
2019/0352853 A1 * 11/2019 Baum .................. D21H 27/002

FOREIGN PATENT DOCUMENTS

CN 103189292 A 7/2013
CN 204503626 U 7/2015
EP 0336661 B1 8/1995
EP 0857453 B2 2/2007
EP 2308773 B1 7/2013
FR 2804062 A1 7/2001
GN 1343477 A 4/2002
GN 1386469 A 12/2002
GN 1796246 A 7/2006
JP 6285978 A2 10/1994
JP 2011032484 A 2/2011
KR 1020150127727 A 11/2015
WO 9834781 A1 8/1998
WO 2008104197 A1 9/2008

* cited by examiner

TEAR RESISTANT WIPER

This application claims the benefit of priority from U.S. Provisional Application No. 62/348,288 filed on 10 Jun. 2016, the contents of which are incorporated herein by reference.

FIELD OF INVENTION

The present invention relates to tear resistant disposable wipers suitable for use in personal care and hygiene related cleaning applications.

BACKGROUND

Disposable wipers, including wet wipes, have long been used in a number of different personal care and hygiene related applications including, for example, as perineal wipes, hand wipes, face wipes, and so forth. Users of such wipes desire a wipe that has a soft and pleasing feel to the touch. In addition, users also desire a wipe that is consistently moist having neither too much nor too little moisture. With respect to such articles, it is common for multiple wet wipes to be provided in a resealable dispenser in order to allow the end user to remove the desired number of wipes from the dispenser at the time of use. This helps maintain the desired moisture content of the wipes over extended periods of time. In use, the wipes are rubbed against the intended surface and experience a variety of frictional and torsional forces. However, dispensing of the wipes also puts frictional and other mechanical forces on the wipe that can result in tears, punctures or other damage to the wipe. Achieving the desired tactile properties together with the desired strength and durability needed for converting, dispensing and use has proven difficult.

Therefore, in order to address the unmet needs associated with prior wet wipes, the present invention provides wet wipes having a pleasing hand and which have a tear resistant edge in order to provide stronger and more durable wipes better able to withstand the forces and stresses commonly associated with converting and dispensing of the wipes.

SUMMARY OF THE INVENTION

Tear resistant wipes are provided having a repeating pattern of closely spaced and thin linear embossed elements adjacent at least the leading edge of the wipe. In this regard, the wipes have a first pattern of emboss elements extending along a first edge and inwardly less than about 33% of the wipe width such as, for example, extending between about 0.6 cm and about 8 cm towards the (non-adjacent) opposed edge. When presented in a stack the first or leading edge will be oriented such that it is exposed, comprising an outer portion of said stack. The emboss elements of the first emboss pattern can comprise linear elements with an aspect ratio of at least 2:1 and a width less than about 1.5 mm. In addition, the linear emboss elements of the first emboss pattern can occupy about 5 and about 30% of the area associated with the first emboss pattern. In certain embodiments, the first emboss pattern can create numerous substantially discrete unembossed pockets having a size less than about 50 $mm^2$ such that the discrete unembossed pockets occupy the majority of the area over which the first pattern extends. Further, the linear emboss elements of the first emboss pattern can have a length of between about 2 and about 40 mm.

Adjacent the first emboss pattern, the wipes may either have no embossing or a second emboss pattern of emboss elements having an embossed area less than that of the first emboss pattern. In this regard, the second emboss pattern preferably has an embossed area at least 25% lower than that of the first emboss pattern. In certain embodiments, the second emboss pattern will predominantly comprise unembossed areas or elements having an area greater than 100 $mm^2$. In various other embodiments, the second emboss pattern may also comprises linear emboss elements and have an emboss area of between about 0.5 and about 10%. Still further, the wipes may have a third pattern of emboss elements located adjacent the trailing edge (opposed to the first edge) and wherein the third pattern has emboss parameters the same as that of the first pattern.

The tear resistant wipes can be provided in a stack comprising between about 10 and about 250 wipes. In certain embodiments, the individual wipers within the stack may be folded provided in an in inter-connected and/or inter-folded format. In a particular embodiment, the stack may comprise wipes folded so as to form a first folded panel adjacent the first edge and an underlying central panel. In certain embodiments, the individual wipes may be interconnected such as by having frangible tabs or adhesive connecting the trailing and leading edges of adjacent wipes.

DETAILED DESCRIPTION

Definitions

Figure 1:
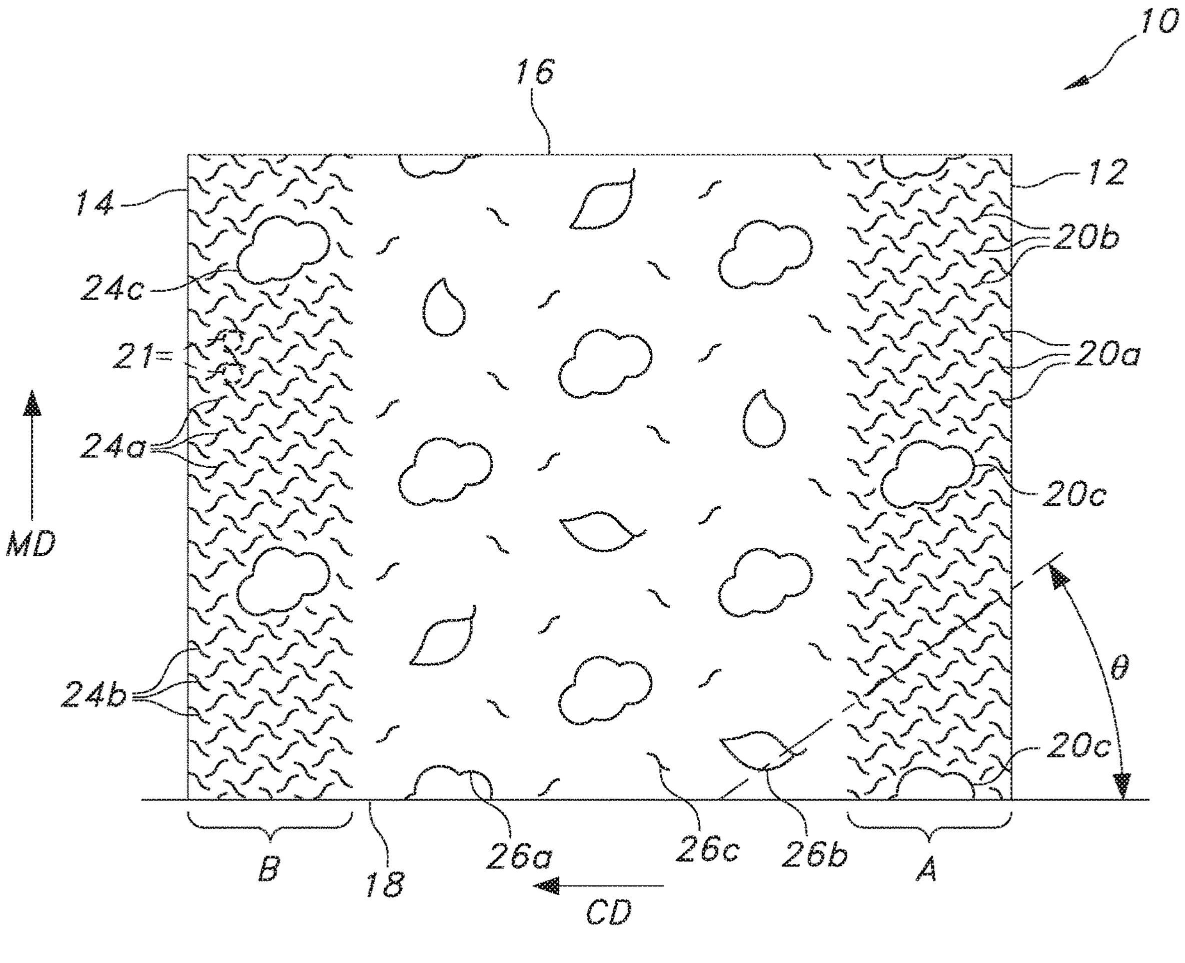
FIG. 1 is a top plan view of a wipe of the present invention.

Throughout the specification and claims, discussion of the articles and/or individual components thereof is with the understanding set forth below.

As used herein the term "cellulosic" means those materials comprising or derived from cellulose including natural or synthetic cellulose as well as that derived from both woody and non-woody sources.

As used herein, the term "comprising" or "including" or "having" are inclusive or open-ended and do not exclude additional unrecited elements, compositional components, or method steps. Accordingly, the terms "comprising" or "including" or "having" encompass the more restrictive terms "consisting essentially of" and "consisting of."

As used herein "continuous fibers" means fibers formed in a continuous, uninterrupted manner having indefinite length and having a high aspect ratio (length to diameter) in excess of 100:1; in use such fibers having a length substantially the same as the length or width dimension of the wiper itself.

As used herein "staple fibers" means natural fibers or continuous synthetic fibers cut to length, such fibers typically having a length between about 0.5 mm and about 200 mm.

As used herein, unless expressly indicated otherwise, when used in relation to material compositions the terms "percent", "weight percent" or "percent by weight" each refer to the quantity by weight of a component as a percentage of the total; other than for liquid compositions such total weight % being based upon a dry product.

As used herein, the term "machine direction" or "MD" refers to the direction of travel of the forming surface onto which fibers are deposited during formation of a fibrous web; such direction also being the direction in which continuous filaments extend.

As used herein, the term "cross-machine direction" or "CD" refers to the direction which is essentially perpendicular to the machine direction defined above.

As used herein, the term "nonwoven web" means a structure or a web of material that has been formed without use of traditional fabric forming processes such as weaving or knitting, to produce a structure of individual fibers or threads that are entangled or intermeshed, but not in an identifiable, repeating manner. Non-woven webs can be formed by a variety of processes including, for example, meltblowing processes, spunbonding processes, hydroentangling processes, staple fiber carding processes, and air laid and wet laid processes.

As used herein, the term "emboss" or "embossment" means a substantially permanent localized depression in the base sheet.

As used herein, the term "stack" is used broadly to include any collection of sheets wherein there is a plurality of individual sheets having surface-to-surface interfaces; this not only includes a vertically stacked collection of individual sheets, but also includes a horizontally stacked collection of individual sheets as well as a rolled or folded collection of sheets.

As used herein, "reach-in" dispensing is understood to mean having to fetch a wipe out of a dispenser through an opening substantially co-extensive with the walls of the dispenser or through a restricted opening smaller than the perimeter defined by the walls. In either case, the top wipe for dispensing rests on top of the remainder of the stack of wipes and the top wipe needs to be separated from the remainder of the stack each time a new wipe is to be dispensed.

As used herein, the term "wet wipe" refers to a fibrous sheet having had a liquid applied thereto and which is retained therein.

In reference to FIG. 1, a wiper 10 is provided defined by first edge 12, opposed second edge 14 extending parallel to the first edge 12, and third and fourth edges 16, 18 that are opposed to one another and extending perpendicular to and between the first and second edges 12, 14. The dimensions of the wiper can vary in accordance with the particular end use and/or desired function of the wiper. In certain embodiments, the wiper can have a diameter (in its greatest dimension) of between about 5 and about 45 cm, and in certain embodiments between about 10 cm and about 30 cm. In other embodiments, the wipe can have a length (extending in the direction of the first and second edges 12, 14) between about 5 cm and about 30 cm or between about 12 cm and about 25 cm. Further, the wiper can have a width (extending in the direction of the third and fourth edges 16, 18) between about 5 cm and about 30 cm or between about 10 cm and about 20 cm. The wiper can have any one of various shapes such as rectangular, square, elliptical, round and so forth. In addition, the edges themselves may be cut to have a straight edge or to have more complex or irregular shape such as being curvilinear; e.g. having a scalloped or sinusoidal shaped edge.

The wiper includes a series of repeating embossments that form one or more patterns. The embossments will comprise permanently compressed areas within the base sheet having significantly decreased thickness and increased density. The wiper 10 includes a first emboss pattern formed by emboss elements 20. The first emboss pattern extends a distance A ("pattern width") from the first edge 12 towards the opposed second edge 14. The pattern width A of the first pattern can occupy less than about 33% of the wipe width and desirably occupies less than about 25% of the wipe width and in certain embodiments can occupy between about 5% and about 25% of the wipe width or between about 5% and about 20% of the wipe width. In a further aspect, the pattern width A of the first pattern can be between about 0.6 cm and about 10 cm, or between about 1 cm and about 8 cm or even between about 2 cm and about 5 cm. The first emboss pattern includes a repeating pattern of emboss elements 20, such elements may be the same or different and may have an orientation that is the same or different from one another. The first emboss pattern can have an embossed area (over the area it occupies) of between about 30% and about 5% or between about 5.5% and about 25% or between about 6% and about 14%.

In reference to the embodiment shown in FIG. 1, the first pattern adjacent the first edge 12 is formed by emboss elements 20*a*, 20*b* and 20*c*. The emboss elements 20 are linear or curvilinear and have an aspect ratio (L:W) of at least about 2:1 and still more desirably at least about 5:1 or at least about 10:1. In addition, the linear or curvilinear embossments desirably have a width less than 1.5 mm such as between about 0.005 mm and about 1.5 mm and in certain embodiments the width of the linear embossments can be between about 0.01 mm and about 1.25 mm or even between about 0.1 mm and about 1 mm. With respect to patterns employing discrete emboss elements, the embossment-to-embossment spacing is relatively small in the first pattern; in this regard discrete embossments can, in certain embodiments, have a center-to-center spacing of between about 1 mm and about 25 mm or between about 2 mm and about 15 mm or even between about 2.5 and about 11 mm. For purposes herein, the center-to-center distance of emboss elements is determined from the mid-point of the linear embossment, and as between the closest emboss element. The size, spacing and orientation of the linear embossments is such that the pattern predominantly forms unembossed regions or pockets 21 less than about 50 $mm^2$ and still more desirably less than about 45, 35 or even 30 $mm^2$. The size of an unembossed pocket can, for the purposes herein, be measured by the size of a uniform circle (e.g. having a uniform radius) that can be positioned within the unembossed pocket without having any embossed elements overlap the same. The first pattern may include unembossed pockets or regions greater than 50 $mm^2$, 60 $mm^2$ or even 80 $mm^2$ however such large unembossed pockets should comprise less than about 33% of the area and still more desirably less than about 25% or even 20% of the area occupied by the first emboss pattern. In certain aspects, the first emboss pattern can lack any unembossed pocket having any dimension greater than 90%, 80% or even 75%, of the first pattern width. In this regard, the use of thinner, more densely spaced embossments allows for a greater increase in edge strength and durability.

The linear embossments can have varied shapes, including for example, both geometric and curvilinear. In certain embodiments, the embossments can have a segment extending predominantly in the MD (i.e. +/−45° from the MD direction) and a segment extending predominantly in the CD (i.e. +/−45° from the CD direction). The linear embossments may be discrete embossment or can form a continuous embossment such as a crisscross or mesh-like pattern provided that the emboss pattern meets the other parameters described herein. With respect to the use of discrete embossment elements, the elements can have a length of about 2 mm and about 40 mm or between about 3 mm and about 20 mm or even between about 3 mm and about 25 mm (length being measured as the actual length of the linear embossment, e.g. arc length). By way of non-limiting example the linear embossments can have an S-shape, Z-shape, X-shaped, W-shaped, C-shaped, J-shaped, O-shaped, V-shaped, T-shaped, I-shaped and so forth. With respect to individual embossments, they can have free ends or form a continuous loop shape (e.g. ellipse, circle or other). The embossments can comprise icons such as for example a cloud, dog, bear, leaf, feather, flower or other recognizable image or character. In reference to FIG. 1, emboss elements 20*c* comprise icons.

In certain aspects, the orientation of the individual embossments can vary relative to the length and width direction and/or MD and CD, desirably being positioned in alternating orientation such that adjacent elements extend in a skewed manner relative to the MD or lengthwise direction or in certain examples may extend in directions substantially orthogonal to one another. In certain embodiments, emboss elements can extend substantially in the lengthwise direction or MD and adjacent elements can extend substantially in the widthwise or cross-direction. For example, and in reference to the embodiment shown in FIG. 1, the emboss elements 20*a*, 20*b* are positioned proximate each other in an alternating fashion and are oriented substantially perpendicular to one another.

In addition, a series of embossments 20 can be aligned in at least one direction. In this regard, a series of embossments can be aligned in the lengthwise direction, widthwise directions or askew to said directions (e.g. be aligned in the MD, CD or askew to the MD and CD). In certain embodiments, a series of embossments or a continuous embossment can be aligned in a direction at an angle θ, relative to the widthwise direction or CD, of between about 30 degrees and about 60 degrees or between about 35 and about 55 degrees. In reference to FIG. 1, the series of linear embossments 20*a* of the first pattern are aligned at an angle askew to both the MD and CD (both the length and width of the sheet) being aligned at an angle of about 45°.

In one aspect, the area extending inwardly from where the first pattern ceases to the second opposed edge may be unembossed. Alternatively, the wiper can also include a second emboss pattern. The second emboss pattern can, in certain embodiments, extend from the end of the first pattern across the wiper to the opposed second edge (not shown) or can extend to the end of a third emboss pattern located adjacent the opposed second edge (as shown in FIG. 1). The second emboss pattern has an emboss area significantly less than that of the first emboss pattern and in certain aspects can have an embossed area of between about 0.5% and about 10% or between about 1% and about 6%. In addition, desirably, the embossments are discrete and, unlike the first pattern, are not closely spaced. The second emboss pattern will have an emboss area less than that of the first emboss pattern; the emboss area of the second pattern desirably being at least 20% less than that of the first emboss area and still more desirably being at least about 30% less than that of the first emboss pattern. The size, spacing and orientation of the embossments of the second pattern can be selected such that the pattern predominantly forms unembossed pockets greater than about 100 $mm^2$ and still more desirably greater than about 125, 150 or even 200 $mm^2$. The emboss elements forming the second pattern can also be linear or curvilinear having parameters (other than area and density) such as those described herein above in reference to the first emboss pattern. However, in certain embodiments, the emboss elements forming the second pattern can optionally have a smaller aspect ratio and greater width than the elements of the first emboss pattern. The second embossing patterns can have a series of small discrete elements and larger elements such as those that form an icon or image. In reference to the embodiment depicted in FIG. 1, the second pattern comprises a repeating pattern widely spaced s-like emboss elements 26*c* and larger elements 26*a*, 26*b* comprising an icon, e.g. a cloud and leaf in this particular embodiment.

In reference to FIG. 1, the second emboss pattern is formed by emboss elements 26. The individual emboss elements include a cloud icon 26*a*, leaf icon 26*b* and an s-like element 26*c*. In the embodiments shown, the individual emboss elements 26 of the second pattern are aligned in a direction askew to both the MD and CD and, in the embodiment shown, at an angle of 35 degrees which is slightly than less the 45 degree angle as shown with respect to the series of first emboss elements 20*a* of the first emboss pattern. Further, the first and second emboss patterns include emboss elements 20*c*, 26*a* forming an icon that are the same as one another and that are also the same as an icon within the third pattern, i.e. emboss element 24*c*. The alignment of these matching elements and adoption of identical icons provides improved operations in manufacture and a more coordinated look and appearance.

As noted above, a third emboss pattern may be positioned adjacent the second side edge 14. The third emboss pattern and the individual embossments forming the same may by selected consistent with the parameters described herein above with respect the first emboss pattern adjacent the first edge 12. The third emboss pattern may be the same or different from the first emboss pattern. In reference to FIG. 1, a third emboss pattern is formed by embossments 24 located adjacent the second edge 14. The first and third embossing patterns each comprise a repeating pattern of s-like emboss elements 20*a*, 20*b*, 24*a*, 24*b* and larger elements 20*c*, 24*c* comprising an icon, e.g. a cloud which in this instance matches the icon from the second pattern.

The wipes of the present invention comprise a porous, fibrous base sheet material. In this regard the porous material will have individual openings or interstitial spaces which, in certain embodiments, collectively form pathways through the thickness of the material via adjacent, inter-connecting spaces or openings. The fibrous sheets may comprise continuous fibers, staple length fibers, or combinations of the same. The wiping substrate substantially retains its integrity when wet and, in certain aspects, remains resiliently compressible when wet. In addition, the fibrous sheets may comprise either woven, knit, or nonwoven fabrics and further the fibrous sheets may be used to form laminates with one or more additional materials. Suitable fibrous sheets will typically have a dry basis weight of from about 20 $g/m^2$ to about 200 $g/m^2$. In certain embodiments, the dry basis weight of the fibrous sheet will be about 25 $g/m^2$ to about 150 $g/m^2$ and in still further embodiments may be between about 30 $g/m^2$ to about 120 $g/m^2$. The present invention is particularly well suited for use with wipes having smaller diameter fibers and/or those incorporating higher levels of cellulosic fibers.

In certain embodiments, the fibrous material can include fine thermoplastic fibers such as, for example, those having an average fiber diameter of between about 0.5 and about 10 micrometers. In certain embodiments, the thermoplastic fibers can have an average fiber diameter of about 1 to about 8 micrometers or between about 2 to about 7 micrometers. Such finer fibers are advantageous from the standpoint of providing a good hand feel and helping to maintain uniform moisture content through a sheet and stack. The thermoplastic polymer fibers may also, desirably, be continuous or substantially continuous. Polymers suitable for forming such fibers include, but are not limited to, polyolefins, polyesters, polyamides, polyhydroxyalkanoates, polylactic acids, or other fiber forming polymers. Preferred polymeric fibers include, but are not limited to, those comprising polypropylene and/or polyethylene. The thermoplastic fibers may be formed according to one or more various processes including, but not limited to, those formed by melt-extrusion processes such as, for example, meltblowing and other known processes. Methods of making fine fibers and related webs are described in, for example, in U.S. Pat. No. 3,849,241 to Butin et al., U.S. Pat. No. 4,443,513 to Meitner et al.; U.S. Pat. No. 4,853,281 to Win et al.; U.S. Pat. No. 6,200,669 to Marmon et al., U.S. Pat. No. 7,150,616 to Haynes et al., U.S. Pat. No. 7,316,552 to Haynes et al., and so forth. In this regard, in certain embodiments, the fibrous material may comprise between about 100% and 15% thermoplastic fibers, or between about 85% and about 25% thermoplastic fibers or even between about 45% and 25% thermoplastic polymer fibers.

The fibrous material can also include cellulosic fibers. In this regard, the fibrous material can include up to about 85% cellulosic fibers and in certain embodiments can comprise between about 15% and about 75% cellulosic fibers and in still further embodiments can comprise between about 55% and about 75% cellulosic fibers. The cellulosic fibers may comprise traditional paper making fibers including woody fibers such as those obtained from deciduous and coniferous trees, including, but not limited to, softwood fibers, such as northern and southern softwood kraft fibers, and also hardwood fibers, such as eucalyptus, maple, birch, and aspen. Other papermaking fibers that can be used in the present disclosure include paper broke or recycled fibers and high yield fibers. Various pulping processes believed suitable for the production of cellulosic fibers include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers. In addition, the cellulosic fibers may comprises non-woody fibers, such as cotton, abaca, bamboo, kenaf, sabai grass, flax, esparto grass, straw, jute hemp, bagasse, milkweed floss fibers, pineapple leaf fibers and so forth. Still further, the cellulosic fibers may comprise synthetic fibers derived from cellulosic materials such as, for example, viscose, Rayon, lyocell or other comparable fibers. Moreover, if desired, secondary fibers obtained from recycled materials may be used, such as fiber pulp reclaimed from sources such as, for example, newsprint, paperboard, office waste, etc. The fibrous sheet material can comprise a single variety of cellulosic fibers or alternatively can comprise mixture of two or more different cellulosic fibers. As is known in the art, it is often desirable to employ mixtures of fibers especially when utilizing recycled or secondary fibers.

Coformed materials are particularly well suited for use in the present invention. Coform nonwoven webs are formed by the comingling of polymeric fibers and absorbent fibers, such as polyolefin fibers and cellulosic fibers, as the fibers are entrained by a common airstream before they are deposited onto a forming surface. Examples of such coform base sheet materials, and methods of making the same, are described U.S. Pat. No. 4,100,324 to Anderson et al., U.S. Pat. No. 5,350,624 to Georger et al., US2011/0151196 to Schmidt et al., US20212/171919 to Jackson et al. and so forth. In certain embodiments such coform sheets can comprise air-formed matrix of thermoplastic polyolefin meltblown fibers and cellulosic or wood pulp fibers. The meltblown fibers can, in certain embodiments, be continuous fibers.

Wet-laid or hydroentangled nonwoven sheet materials are also believed well suited for use in the present invention. Hydroentangling is a process of forming a nonwoven a web which generally includes the steps of (i) depositing lose fibers on a porous belt or patterned screen and (ii) subjecting the fibers to one or more rows of fine high-pressure jets of water so that the fibers become sufficiently entangled with one another to form a coherent nonwoven web. In certain aspects, hydroentangling readily allows for the combination of different fiber types, such as combining fibers of distinct composition (e.g. polymeric fibers and wood pulp fibers) or fibers of distinct size (e.g. continuous length and staple length fibers). By way of non-limiting example, suitable hydroentangled materials, and methods of making the same, are described in greater detail in U.S. Pat. No. 4,925,722 to Jeffers et al., U.S. Pat. No. 5,284,703 to Everhart et al., and US2010/0279085 to Adam et al. In one embodiment, the fibrous sheet can comprise a mixture of pulp fibers and continuous polyolefin spunbond fibers.

In further embodiments, the fibrous sheet of the present invention can comprise an air-laid nonwoven web. In the air-laying process, fibers are entrained in an air stream, intermingled and then deposited onto a forming screen or wire, usually with the assistance of a vacuum supply. The randomly deposited fibers are then bonded to one another autogenously, such as through the use of heat and/or pressure, or through the use of a binder, such as by the inclusion of binder fibers or the application of adhesive to the web. By way of non-limiting example, various examples of suitable air-laid nonwoven sheets, and methods of making the same, are described in U.S. Pat. No. 4,548,856 to Ali Kahn et al., U.S. Pat. No. 6,811,638 to Close et al., U.S. Pat. No. 6,946,413 to Lange et al., US2004/0192136 to Gusky et al. and so forth.

In order to impart the embossing patterns to the base sheet, the base sheet may be treated by one or more embossing techniques known in the art that impart localized compression and/or bonding corresponding to the desired patterns. In this regard, the base sheet can be embossed by the application of localized pressure, heat, and/or ultrasonic energy. In certain aspects, the base sheet may be embossed as is known in the art by using a pair of embossing rolls, wherein at least one of the rolls has a pattern of protuberances or "pins" corresponding to the desired pattern of emboss elements to be imparted to the base sheet. The two cooperative rolls form a nip through which the base sheet is passed with the application of pressure and, optionally, heat.

While suitable embossments may be formed without the application of heat, use of heat together with pressure is preferred. The embossing can be conducted as is known in the art employing a nip formed by patterned roll and a smooth anvil roll ("pin-to-flat") or by two coordinated patterned rolls ("pin-to-pin"). With respect to the use of a smooth anvil roll, such roll may be coated with a resilient material, such as rubber, in order to improve the formation of embossments within the web. Various embossing methods are shown and described in U.S. Pat. No. 3,855,046 to Hansen et al., U.S. Pat. No. 6,036,909 to Baum, U.S. Pat. No. 6,165,298 to Samida et al. and so forth. As is known in the art, the pressures, temperatures, residence time, base sheet composition and thickness, and other parameters will impact the selection of the desired degree of pressure and/or heat applied to the base sheet to impart the desired pattern of embossments. Nevertheless, in many embodiments, it will be desirable to apply a contact pressure in the nip of between about of between about 1400 $kg/cm^2$ (about 20,000 PSI) and about 4200 $kg/cm^2$ (about 60,000 PSI). In addition, when incorporating polyolefin fibers such as polypropylene, one or more of the rolls can have a temperature of between about 65° C. and about 90° C.

Figure 2:
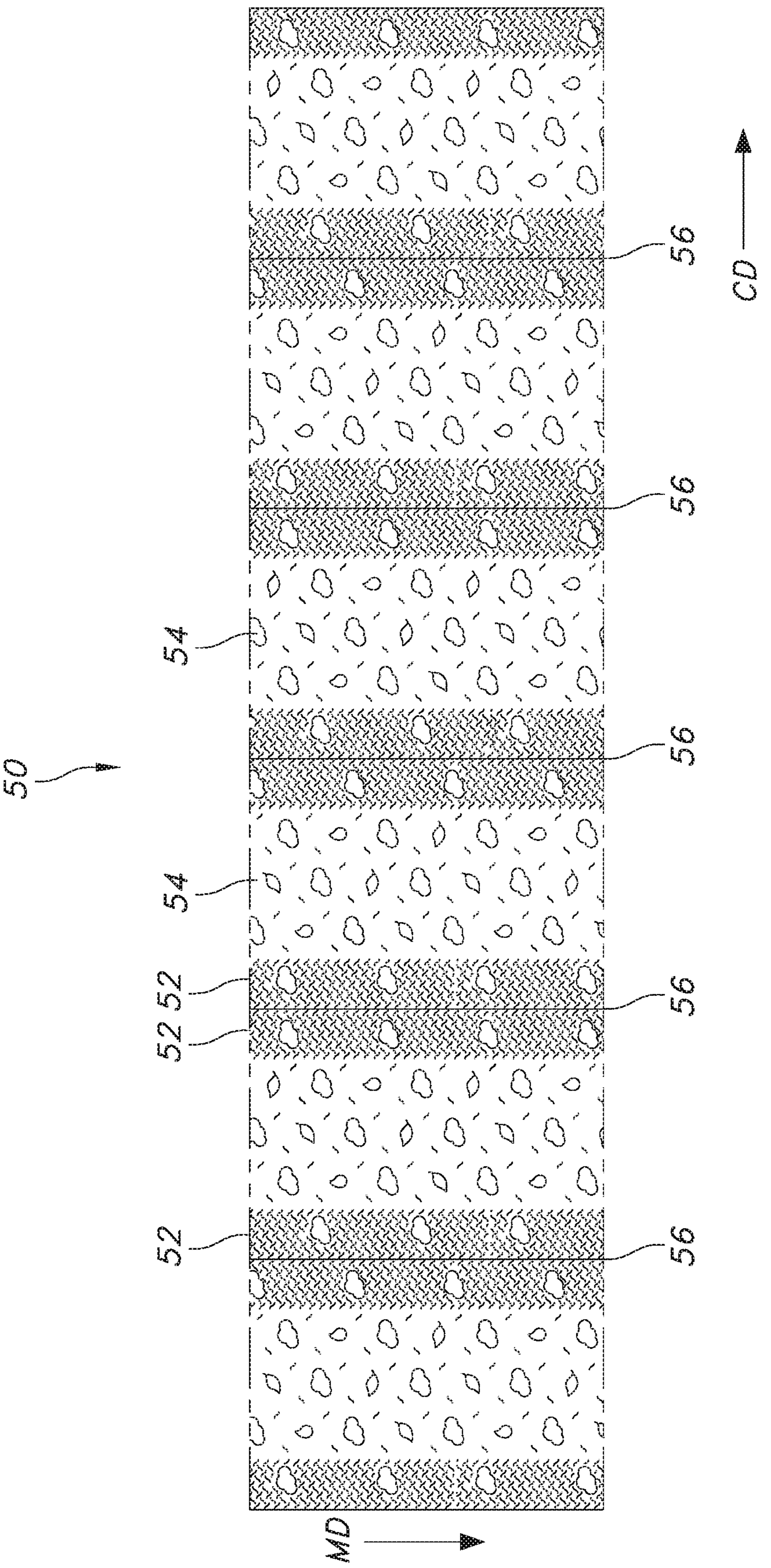
FIG. 2 is top plan schematic view of an embossed fabric suitable for converting to form wipes of the present invention.

In manufacturing, as is known in the art, for efficiency and speed of production it may often be desirable to emboss multiple series of patterns across the full CD width of a base sheet and thereafter slit the wide base sheet in the MD to form wipes of the desired width. In reference to FIG. 2, a wide production sheet 50 is provided having a repeating series of a first emboss pattern 52 and a second emboss pattern 54. The first emboss pattern 52 is formed in the wide production sheet 50 having a width in the CD twice that desired for the final converted wipe. The wide production sheet is cut along the slit lines 56 extending down the middle of the first emboss patterns 52 thereby resulting in a sheet having the desired edge embossing and a distinct central embossing pattern 54. In order to achieve multiple different edge emboss patterns in the finished product, it will be readily appreciated that a different edge emboss pattern can replace every other first emboss pattern.

The wipes can be presented in a stacked format; the stack may, for example, include between 3 and 250 wet wipes and, in further embodiments may include between about 10 and about 150 wet wipes and in still further embodiments may include between about 10 and about 90 wet wipes. In one aspect, the sheets forming the stack may be superposed with one another in a folded or unfolded orientation. Various known folded configurations can be used in conjunction with the present invention including, for example, V-folds, Z-folds, W-folds, quarter-folds and so forth. In certain embodiments, the stack of wipes by be inter-leaved whereby the folded panel of one wipe is positioned between two folded panels of one or more adjacent wipes. Equipment and processes for forming dispensable stacks of wipes are known in the art; examples of which include, but are not limited to, those described in U.S. Pat. No. 3,401,927 to Frick et al.; U.S. Pat. No. 4,502,675 to Clark et al.; U.S. Pat. No. 5,310,398 to Yoneyama, U.S. Pat. No. 5,964,351 Zander, U.S. Pat. No. 6,612,462 to Sosalla et al., and so forth. In another aspect, such as with respect to product formats utilizing a continuous length of sheet material, the stack may be provided comprising individually separable wet wipes having perforated or over-bonded lines of weakness which allow separation into smaller individual sheets of a desired shape and size. In this regard, use of such lines of weakness are commonly employed in conjunction with stacks in a rolled or festooned format.

Figure 3:
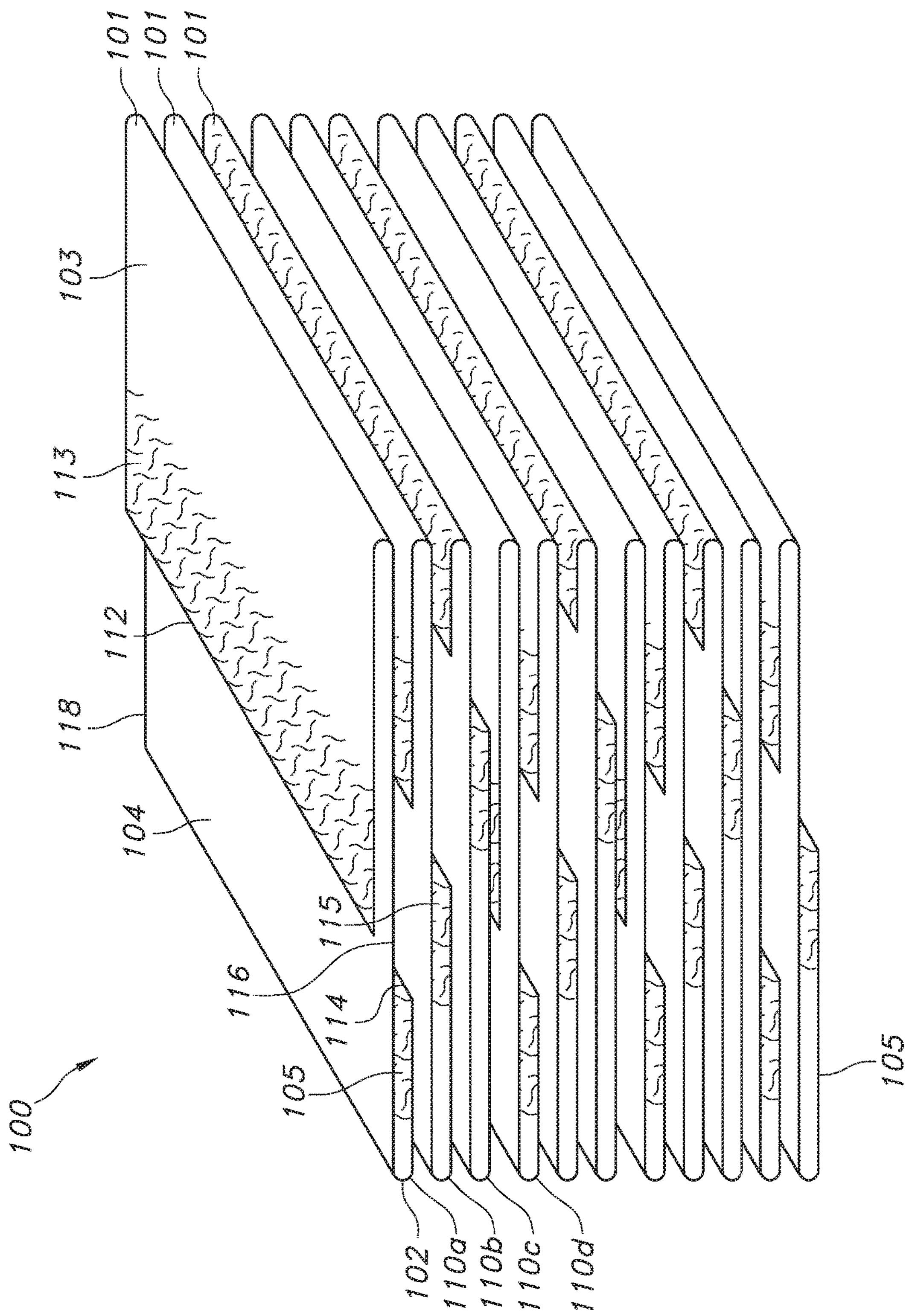
FIG. 3 is perspective view of a stack of wipes of the present invention.

In reference to FIG. 3, a stack 100 is provided comprising a plurality of individual wipes 110. The individual wipes can be completely separated from one another or be interconnected by separable elements such as frangible tabs or adhesively as noted herein below. Each wipe 110 has first and second opposed edges 112, 114 and third and fourth opposed edges 116, 118. In the present embodiment depicted FIG. 3, a first emboss pattern 113 is disposed adjacent the first edge 112 and an identical emboss pattern 114 is disposed adjacent the opposed second edge 114. As discussed herein above a second more open emboss pattern (not shown for ease of reference), may optionally be disposed between the edge emboss patterns 112, 114. The first edge 112 and associated first emboss pattern 113 are exposed on an outer surface of the stack and in the present embodiment on the upper surface of the stack 100. The wipes 110 are presented in a z-fold format with each wipe having a first fold 101 proximate the first edge 112 forming a first panel 103 overlying a central panel 104 of the wipe 110 and a second opposite fold 102 proximate the opposed second edge 114 forming a second panel 105 folded under and underlying the central panel 104 of the wipe 110. The wipes 110 are sequentially folded and oriented such that removal of the outer or upper most wiper will similarly present and expose the first edge 112 and associated first emboss pattern 113 of the underlying wipe in the stack 100. For example, removal of the upper most wipe 110*a* will expose the first edge of subsequent wipe 110*b*. Further, in embodiments where both the first and second edges have a suitable edge emboss pattern such as described above, folding formats may be used whereby removal of wipes presents either the first or second edge such as in an alternating format (not shown). With respect to the formed stack, a cleaning formulation can be added thereto in a desired amount to form a stack of wet wipes.

In addition, the wipes of the present invention can be used in association with a stack of wipes where individual sheets are connected to and separable from adjacent sheets through the use of a releasable or frangible adhesive. In this regard, the adhesive connecting adjacent wipes can be placed adjacent the trailing edge of the upper sheet and adjacent the leading edge of the lower or subsequent sheet. Placement adjacent such edges results in the adhesive being located on and limited to the regions of the web having the edge emboss patterns described herein.

Figure 5A:
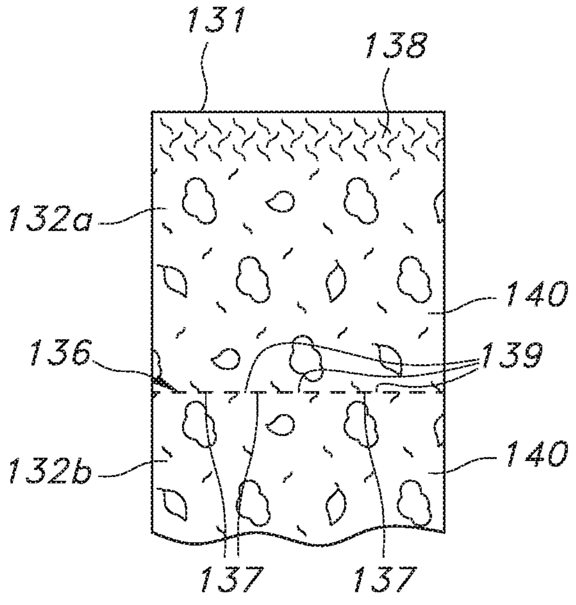
FIG. 5A representatively shows a schematic top view of a portion of a clip of interconnected wipes of the present invention.
Figure 5B:
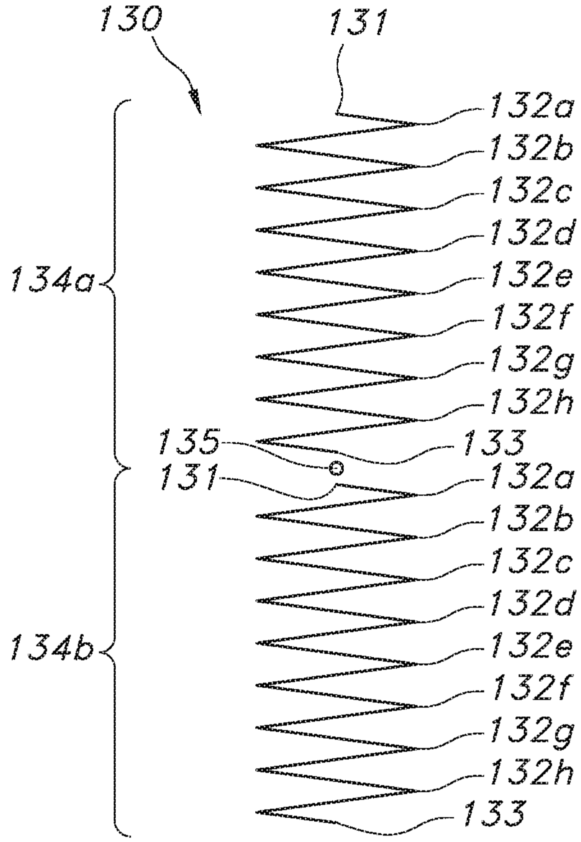
FIG. 5B representatively shows an exploded side schematic view of interconnected, folded wipes of the present invention.

In a particular embodiments, and in reference to FIGS. 5A and 5B, a series or clip 134 of inter-connected wipes is provided that includes a plurality of separable individual sheets 132*a*, 132*b*, 132*c*, etc. Adjacent the leading edge 131 of the first wipe 132*a* in the clip 134*a*, the first edge emboss pattern 138 is applied consistent with the teachings described herein above. The trailing edge of the first wipe 132*a* and the leading edge of the second wipe 132*b* are connected along a line of weakness 136 such as may be achieved by scoring, perforations, and so forth. As shown, the line of weakness comprises a perforation line and having a plurality of individual perforations 137 that form discrete frangible tabs 139 spaced apart and extending across the width of the wipes. Individual sheets may thus be easily separated from one another in use. Further, at least the leading edge 131 of the first wipe 132*a* in the clip 134 and trailing edge 133 of the last wipe 132*h* in an individual clip 134 will have the first edge emboss pattern 138 as described herein above. Alternatively, the leading and trailing edges of each sheet 132*a*-132*h* may have the first edge emboss pattern as described herein. In reference to the embodiment shown, the leading edge 131 of the first sheet 132*a* and the trailing edge 133 of the last wipe **123*h* in the clips 134*a*, 134*b* will have the first emboss pattern 138** adjacent the edge region as described herein.

The stack 130 of separable individual wipes 132 will also include multiple clips **134*a*, 134*b*, etc. The individual clips are interconnected through the use of an adhesive such as may be applied as a line, bead or more broadly over the selected portion of the wipe. The adhesive 135 will be located adjacent the trailing edge 133 of the last wipe 132*h* within the first clip 134*a* and the leading edge 131 of the first wipe 132*a* in the subsequent clip 134*b***. Thus, the adhesive will be located over the sections of the adjacent wipes that have the edge emboss pattern applied thereto. Additional details regarding the manufacture of fan folded clips of wipes is described in U.S. Pat. No. 6,612,462 to Sosalla et al., the contents of which are incorporated herein to the extent consistent herewith. The selective use of the embossing patterns described herein provide for adhesively interconnected wipes and/or clips having more uniform dispensing and with less frequency of tearing, puncturing and/or other damage to the wipes.

Cleaning Formulations

A liquid cleaning composition can be incorporated into the sheets to from a wet wipe. Desirably, the liquid cleaning composition is added to the sheets in an add-on amount of from about 50% to about 700% (by weight of the dry porous sheet), more desirably from about 75% to about 500% (by weight of the dry porous sheet), even more desirably from about 100% to about 400% (by weight of the dry porous sheet) or from about 100% to about 350% (by weight of the dry porous sheet). A wide variety of liquid cleaning formulations are believed suitable for use with the present invention. The selection of a particular cleaning formulation will vary significantly with the intended end use of the wiper and other factors known to those skilled in the art. The liquid cleaning composition can comprise a solution, emulsion or dispersion. By way of example, cleaning compositions believed suitable for use with the present invention include, but are not limited to, those described in U.S. Pat. No. 4,772,501 Johnson et al., U.S. Pat. No. 4,941,995 Richards, U.S. Pat. No. 8,563,017 Cunningham et al., U.S. Pat. No. 8,987,180 Wenzel et al., US2010/0256033 to Menard et al., WO2015/084880 to Park et al. and so forth.

The liquid cleansing composition includes at least a solvent and a surfactant. The solvent can comprise water, alcohol (e.g. IPA) or mixtures of water and alcohol. Desirably, the cleaning formulation comprises an aqueous formulation comprising greater than 50% water and still more desirably at least about 70% water. In certain embodiments, the cleansing formulation can include between about 70% and about 99% water or between about 75% and about 98% water or even between about 85% and about 98% water. In many applications, such as with respect to perineal wipes, the use of higher percentages of water can help reduce skin sensitivity and/or help prevent use of the wet wipe from leaving the user with a sticky or tacky feeling after use.

The liquid cleaning composition further includes one or more surfactants. The cleaning composition comprises less than about 20% surfactant, based upon the weight of the cleaning composition. In certain embodiments, the surfactant can comprise less than about 15% or less than about 10% of the cleaning composition. In certain embodiments, the cleaning formulation can comprise between about 20% and about 0.5% surfactant, or between about 15% and 1% surfactant or even between about 10% and about 2% surfactant. Numerous surfactants are believed suitable for use with the present invention including non-ionic surfactants, anionic, cationic, amphoteric, zwitterionic and combinations thereof.

In certain embodiments, the surfactant may comprise one or more nonionic surfactants. By way of examples, suitable classes of nonionic surfactants include, but are not limited to, alkyl glycosides and alkyl polyglycosides, alkyl glucosides and alkyl polyglucosides, ethoxylated alkylphenols, ethoxylated fatty ($C_8$-$C_{22}$) alcohols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, and mixtures thereof. One or more anionic, cationic, or zwitterionic surfactants may also be used in the cleaning composition of the present invention, either alone or in combination with other surfactants. By way of example, additional surfactants believed suitable for use in the present invention includes, but are not limited to, alkyl sulfates, alkyl ether sulfates, alkyl ether sulfonates, alkylauryl sulfonates, a, fatty acid amide polyoxyethylene sulfates, aminopropyl alkylglutamide, sodium alkyliminodipropionate, carboxybetaines, sulfobetaines, phosphobetaines, phosphitaines, amine oxides, cocamidopropyl betaine, coco-betaine; lauryl hydroxy sulfobetaines, alkyl amines, dimethyl alkyl amines, alkyl betaines, quaternized APG, ethoxylated alkylamines, and combinations thereof.

The liquid cleaning composition may, optionally, include one or more preservatives or antimicrobial agents to increase the shelf life of the wet wipe. Suitable preservatives that can be used in the present invention include, but are not limited to, sodium and other metal salts of benzoic acid (e.g. sodium benzoate available under the trade name PUROX S from Emerald Performance Materials); mixtures of methylchloroisothiazolinone and methylisothiazolinone (e.g. KATHON CG from Dow Chemical); methylisothiazolinone (e.g. NELONE 950 from Rohm Haas); DMDM hydantoin and iodopropynyl butylcarbamate (e.g. GLYDANT PLUS from Lonza); hydroxybenzoic acid esters (parabens), such as methylparaben, propylparaben, butylparaben, ethylparaben, benzylparaben, sodium methylparaben, and sodium propylparaben; 2-bromo-2-nitropropane-1,3-diol (e.g. Bronopol from BASF); benzoic acid; sorbic acid and its salts; amidazolidinyl urea (e.g. Germall 115 from Ashlan, Inc.); diazolidinyl urea (e.g. Germall II Ashland, Inc.); and so forth. Combinations of one or more different preservatives are also suitable for use in the present invention. Desirably the preservative is present in the cleaning composition in an amount between about 0.001% and about 5% (by weight of the cleaning composition). In certain embodiments, the preservative may comprise between about 2.0% and about 0.01% by weight of the cleaning composition and, in still further embodiments, may comprise between about 1.0% and 0.1% by weight of the cleaning composition.

The liquid cleaning composition may, optionally, further include one or more additional components such as, for example, antioxidants, astringents, conditioners, emollients, deodorants, external analgesics, film formers, humectants, hydrotropes, pH modifiers, moisturizers, rheology modifiers, fragrances, slip agents, surface modifiers, skin protectants, and so forth.

The wet wipes can be maintained over time in a sealed container such as, for example, plastic pouches or bags, canisters, jars, tubs, buckets and so forth. Desirably the stacked wet wipes are maintained in a resealable container.

When utilizing a stack of wet wipes the use of a resealable container is particularly desirable in order to limit evaporation of the cleaning composition from the remaining unused wet wipes in the container. Exemplary resealable containers and wet wipe dispensers include, but are not limited to, those described in U.S. Pat. No. 4,171,047 to Doyle et al., U.S. Pat. No. 4,353,480 to McFadyen, U.S. Pat. No. 4,778,048 to Kaspar et al., U.S. Pat. No. 4,741,944 to Jackson et al., and US2012/0160864 to Shoaf et al., the contents of which are incorporated herein to the extent consistent herewith. Flexible bag packaging with a resealable label are particularly well suited for use with the present invention and examples of the same include, but is not limited to, those described in U.S. Pat. No. 5,264,265 to Kaufmann, U.S. Pat. No. 6,592,004 to Huang et al., US2005/0011906 to Buck et al., US2010/0154264 to Scott et al., US2010/0155284 to Gerstle et al., and US2014/001196 to Bushman et al., the contents of which are incorporated herein to the extent consistent herewith. Dispensers employing the tabbed and/or continuous roll-type stacks are disclosed, for example, in U.S. Pat. No. 4,651,895 Niske et al., U.S. Pat. No. 6,158,614 to Haines et al., and US2010/0133287 to Tramontina et al., the contents of which are incorporated herein to the extent consistent herewith. The particular stack height and sheet count can vary with the intended format and use. The sheets can be oriented in the stack and the stack incorporated into the container in a manner intended to improve efficiency of use and/or dispensing as is known in the art. In certain embodiments, stacks of wet wipes are desirably arranged and combined with a dispenser to facilitate one at a time dispensing and including known “pop-up” dispensing formats.

Figure 4:
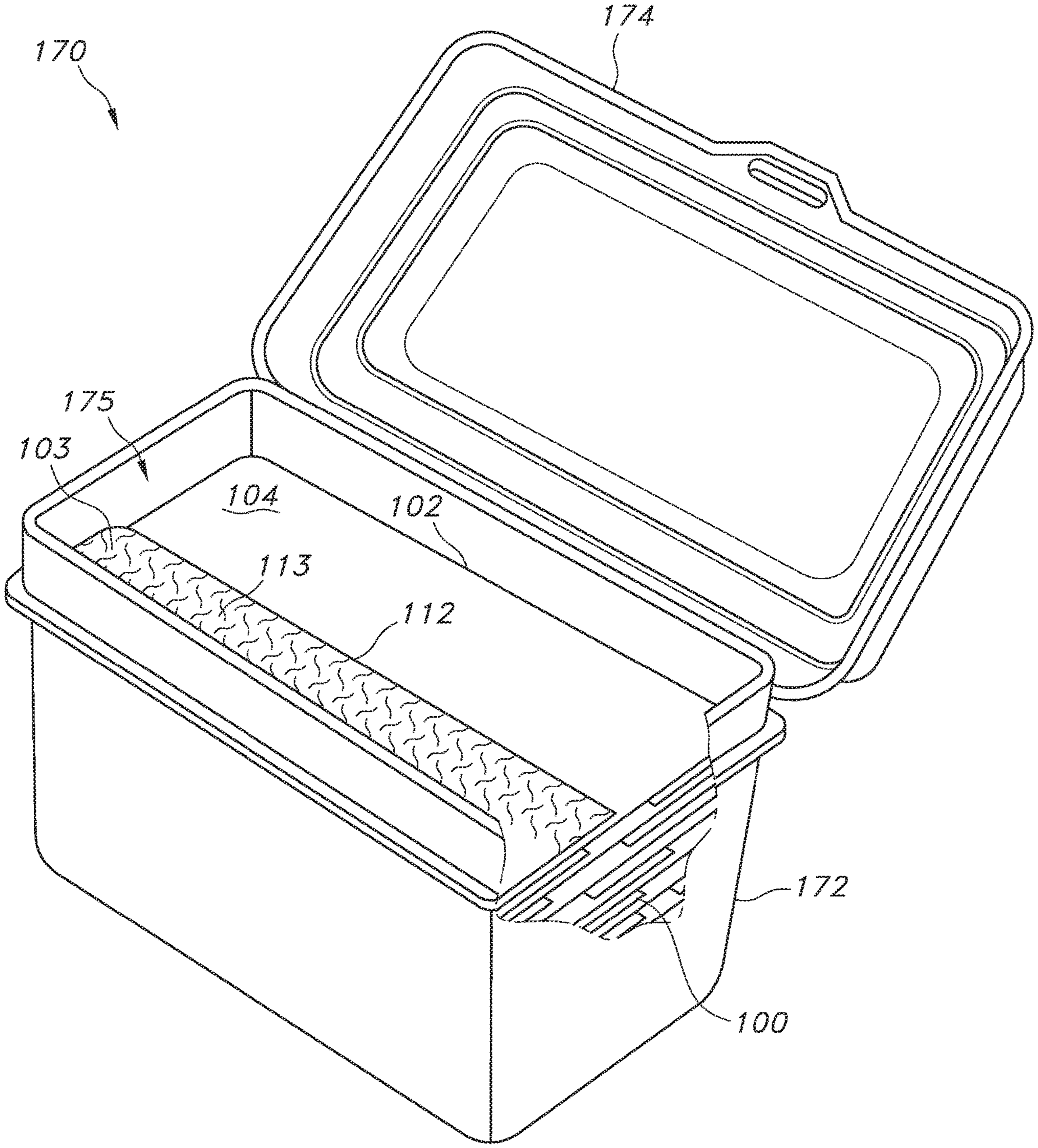
FIG. 4 is a perspective, partially cut-away view of an open dispenser having the stack of wipes depicted in FIG. 3.

In one embodiment, and in reference to FIG. 4, a reach-in dispenser 170 is provided having a tub 172 and a reclosable lid 174 hingedly attached to the tub 172; the tub and lid cooperating to define a sealed interior 175 of the container 170. A stack of wipes 100 is positioned within the tub 172 wherein the first edge 112 and the associated first emboss pattern 113 are presented and exposed such that when the lid 174 is in an open state a user can reach in the tub, grasp the first edge 112 of the wipe 110 and remove the wipe 110 from the stack 100. Upon removing the upper most wipe, a subsequent wipe will be presented again with the first edge 112 being exposed for grasping by the user. Thereafter, the lid can be returned to a closed position (not shown) in order to prevent evaporative loss of the cleaning composition contained in the wipes. In certain embodiments, the dispenser may also include a dispensing plate (not shown) intermediate to the tub and lid, being separately movable in an open and closed position relative to the tub. The dispensing plate can itself be hingedly attached to the lid or the tub and provide a rigid member about the periphery of the plate (proximate the tub walls) and an inner opening comprising a constricted aperture (i.e. an aperture that is smaller than that of the wipe) and/or a slit flexible dispensing film spanning the opening. When a wipe is pulled through the dispensing aperture, the constriction acts to provide drag or frictional resistance on the wipe such that when the first wipe is fully pulled through the dispensing aperture and the leading edge of the subsequent wipe is pulled through the dispensing aperture, the drag acts to cause the inter-connected wipes to separate leaving the first edge of the next wipe above the stack and partially exposed and/or protruding through the dispensing aperture, thereby easily grasped by the user to provide one-at-a-time pop-up dispensing. Various inter-folded formats may also be used to provide a dispenser and stack with one-at-a-time pop-up dispensing.

Figure 6:
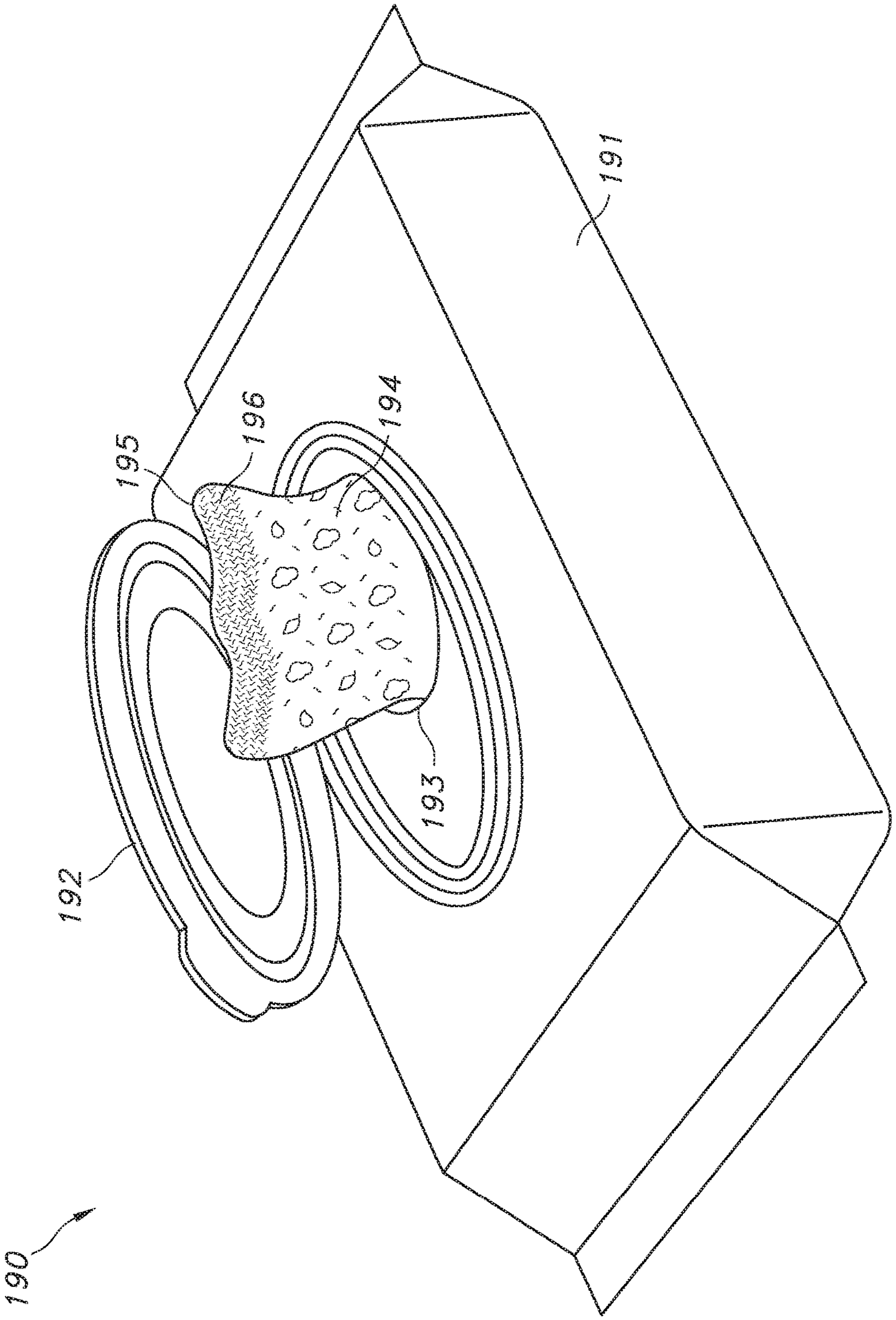
FIG. 6 is a perspective view an open flexible pack dispenser having a stack of wipes of the present invention.

In a further embodiment and in reference to FIG. 6, a dispenser 190 is provided by a flexible pouch 191 and having thereon a rigid-resealable lid 192 attached to the flexible pouch 191. As is known in the art, the flexible pouch includes a removable tab (not shown) such that when the user is ready to extract wipes, the removable tab is peeled away and when removed provides a dispensing orifice 193 through which a wipe 194 can be extracted and removed from the stack (not shown). The size of the dispensing orifice or port can be selected as desired to provide for reach-on dispensing or one-at-a-time and/or pop-up dispensing. The first edge 195 of the wiper having the first emboss pattern 196 is exposed. Removal of a wipe from the stack via the dispensing orifice 193 causes the underlying subsequent wipe (not shown) to present itself above the stack and partially exposed through the dispensing orifice 193. The individual wipes are oriented such that the wiper edge having the edge embossing patterns described herein above are repeatedly presented for grasping, including being presented in an elevated and exposed manner associated with one at a time, pop-up dispensing.

EXAMPLES

Example 1

A nonwoven web was formed in accordance with U.S. Pat. No. 5,350,624 to Georger et al. and U.S. Application 62/381,830 to Vater et al. using a series of three banks of web forming machines. The nonwoven web had a basis weight of 50 gsm and comprised a mixture of 32 wt. % polypropylene meltblown fibers and 68 wt. % wood pulp fibers. The nonwoven web was embossed and slit so as to provide an embossed wipe having the emboss pattern as shown in FIG. 1 with the edge emboss pattern having an embossed area of 8.5% and the center bond pattern having an embossed area of 2.8%. The embossing rolls were maintained at a temperature of 75° C. and applied a pressure of approximately 26 psi (1.8 kg/$cm^2$). Samples having a width of 25.4 mm were taken from the edge portion (having the first emboss pattern) and the central portion (having the second emboss pattern) and the samples were tested for their respective tensile strengths. The edge samples had an average tensile strength of 261 g-f and the center portion had an average tensile strength of 231 g-f.

Example 2

A nonwoven web was formed in accordance with U.S. Pat. No. 5,350,624 to Georger et al. using a series of three banks of web forming machines. The nonwoven web had a basis weight of 50 gsm and comprised a mixture of 32 wt. % polypropylene meltblown fibers and 68 wt. % wood pulp fibers. The nonwoven web was embossed and slit so as to provide an embossed wipe having the emboss pattern as shown in FIG. 1 with the edge emboss pattern having an embossed area of 8.5% and the center bond pattern having an embossed area of 2.8%. The embossing rolls were maintained at a temperature of 75° C. and applied a pressure of approximately 26 psi (1.8 kg/$cm^2$). Samples having a width of 25.4 mm were taken from the edge portion (having the first emboss pattern) and the central portion (having the second emboss pattern) and the samples were tested for their respective tensile strengths. The edge samples had an average tensile strength of 237 g-f and the center portion had an average tensile strength of 218 g-f.

It will be appreciated that while the invention has been described in detail with respect to specific embodiments and/or examples thereof, it will be apparent to those skilled in the art that various alterations, modifications and other changes may be made to the invention without departing from the spirit and scope of the same. It is therefore intended that the claims cover or encompass all such modifications, alterations and/or changes.

What is claimed is:

1. A wipes dispenser comprising:

a container defining an interior space, said dispenser having a dispensing opening and further having a closure mechanism associated with the dispensing opening whereby in a closed position the dispensing opening is occluded and in an open position the dispensing opening is exposed and wipes can be removed through the dispenser opening;

a stack of tear-resistant wipes having a width defined by first and second opposed edges and a length defined by third and fourth opposed edges;

said tear-resistant wipes further having a first emboss pattern of emboss elements extending along said first edge and inwardly less than 33% of the wipe width between 0.6 cm and 8 cm towards said second edge;

the emboss elements of the first emboss pattern having an area of between 5 and 30% and comprise linear or curvilinear elements having an aspect ratio of at least 2:1, a width less than 1.5 mm and wherein the emboss elements of the first emboss pattern comprise discrete curvilinear segments having a length of between 2 and 40 mm and an aspect ratio of at least 5:1; and wherein adjacent said first emboss pattern said tear-resistant wipe has a second emboss pattern of emboss elements having an emboss area at least 20% less than that of the first emboss pattern; and further wherein the first edge comprises an outer portion of said stack and the first emboss pattern has an average tensile strength greater than the average tensile strength of the second emboss pattern by between 19 and 30 g-f, and wherein dispensing is configured such that removal of an outer most wipe in the stack causes a subsequent wipe to be partially pulled through the dispensing opening and exposes the first edge of the outer most wipe having said first emboss pattern.

2. The stack of wipes of claim 1 wherein the area occupied by the first emboss pattern predominantly comprises unembossed pockets having a size less than about 50 $mm^2$.

3. The stack of wipes of claim 1 wherein a series of the emboss elements of the first emboss pattern are aligned along a line extending at an angle of between 30 and 60 degrees as formed with the cross-direction of the wipes.

4. The stack of wipes of claim 1 wherein the linear emboss elements have an average center-to-center spacing of between 1 mm and 25 mm.

5. The stack of wipes of claim 1 wherein the wipes have said second emboss pattern extending adjacent to and in inwardly from said first emboss pattern and further wherein the first emboss pattern further includes emboss elements that form an icon and the second emboss pattern includes elements that form an icon and further wherein said icons are identical.

6. The stack of wipes of claim 5 wherein said icons in said first and second emboss patterns are aligned.

7. The stack of wipes of 1 wherein the wipes have said second emboss pattern extending adjacent to and in inwardly from said first emboss pattern and wherein the second emboss pattern comprises emboss elements having an aspect ratio of at least 5:1, has an emboss area of between about 0.5 and about 10% and has an emboss area at least 25% lower than that of the first emboss pattern.

8. The stack of wipes of claim 7 wherein the second emboss pattern extends inwardly from the first emboss pattern and wherein the area occupied by the second emboss pattern predominantly comprises unembossed pockets having a size greater than about 150 $mm^2$.

9. The stack of wipes of claim 7 wherein said first emboss pattern of emboss elements also extends along said second edge and extends inwardly less than about 33% of the wipe width and wherein said second emboss pattern is extends between said first emboss patterns.

10. The stack of wipes of claim 9 wherein adjacent sheets are interconnected with adhesive and wherein said adhesive is located only within areas having said first emboss pattern.

11. The stack of wipes of claim 9 wherein adjacent sheets are interconnected by frangible tabs located adjacent the first and second opposed edges.

12. The stack of wipes of claim 1 wherein the wipes comprise between about 15 and 75% cellulosic fibers and about 85%- and 25% thermoplastic fibers and further wherein said wipes are impregnated with an aqueous cleaning composition and wherein said wipes contain between 50% to 600%, by weight of the dry base sheet, of said aqueous cleaning composition.

13. The stack of wipes of claim 1 wherein the stack includes inter-connected adjacent wipes and wherein a plurality of adjacent wipes are interconnected with adhesive and a plurality of adjacent wipes are interconnected by frangible tabs.

14. The stack of wipes of claim 13 wherein the first pattern includes adjacent emboss elements oriented substantially orthogonal to one another.

15. A wipes dispenser comprising:

a container defining an interior space, said dispenser having a dispensing opening and further having a closure mechanism associated with the dispensing opening whereby in a closed position the dispensing opening is occluded and in an open position the dispensing opening is exposed and wipes can be removed through the dispenser opening;

a stack of tear-resistant wet wipes comprising:

said tear-resistant wet wipes having a width defined by first and second opposed edges and a length defined by third and fourth opposed edges;

said tear-resistant wet wipes further having a first emboss pattern of emboss elements extending along said first edge and inwardly less than 33% of the wipe width between 0.6 cm and 8 cm towards said second edge;

the emboss elements of the first emboss pattern having an area of between 5 and 30% and comprise linear or curvilinear elements having an aspect ratio of at least 2:1 and a width less than 1.5 mm and wherein the emboss elements of the first emboss pattern comprise discrete curvilinear segments having a length of between 2 and 40 mm and an aspect ratio of at least 5:1; and wherein adjacent said first emboss pattern said tear-resistant wet wipe has a second emboss pattern of emboss elements having an emboss area at least 20% less than that of the first emboss pattern; and further wherein the first edge comprises an outer portion of said stack and the first emboss pattern has an average tensile strength greater than the average tensile strength of the second emboss pattern by between 19 and 30 g-f; and said stack of tear-resistant wet wipes located within the interior of said container and wherein the first edge of the outermost tear-resistant wet wipe is either accessible by or exposed through the dispensing opening.

16. The wipes dispenser of claim 15 wherein the dispensing opening comprises a constricted opening.

* * * * *